United States Patent [19]

Wagoner et al.

[11] Patent Number: 4,536,620

[45] Date of Patent: Aug. 20, 1985

[54] MASTER UNLOCK CIRCUIT FOR AN ELECTRONIC TELEPHONE

[75] Inventors: John G. Wagoner, Vienna, Va.; Louis W. Smith, St. Petersburg, Fla.

[73] Assignee: GTE Business Communication Systems Inc., Northlake, Ill.

[21] Appl. No.: 560,694

[22] Filed: Dec. 12, 1983

[51] Int. Cl.³ .............................................. H04M 1/26
[52] U.S. Cl. .................................................. 179/90 D
[58] Field of Search ................ 179/84 R, 81 R, 90 D, 179/90 BD, 81 C, 84 A, 84 L, 90 A, 99 LS, 84 VF, 189 D; 340/825.31, 825.48, 825.32

[56] References Cited

U.S. PATENT DOCUMENTS

| | | | |
|---|---|---|---|
| 4,099,033 | 7/1978 | Murray | 179/90 D |
| 4,453,040 | 6/1984 | Wolf et al. | 179/81 R X |
| 4,453,042 | 6/1984 | Wolf et al. | 179/90 D X |

*Primary Examiner*—Gene Z. Rubinson
*Assistant Examiner*—James L. Dwyer
*Attorney, Agent, or Firm*—Robert J. Black; Gregory G. Hendricks

[57] ABSTRACT

A circuit which unlocks the signaling circuit of a feature telephone station after it has been locked. A microprocessor disconnects a tone generator from an associated keypad upon detection of operation of a lock button. The microprocessor subsequently connects the tone generator to the keypad upon detection of operation of the lock button and a predetermined master unlock code provided via the keypad. The microprocessor also connects the tone generator to the keypad upon detection of operation of the lock button followed by simultaneous operation of a predetermined plurality of telephone feature buttons.

9 Claims, 1 Drawing Figure

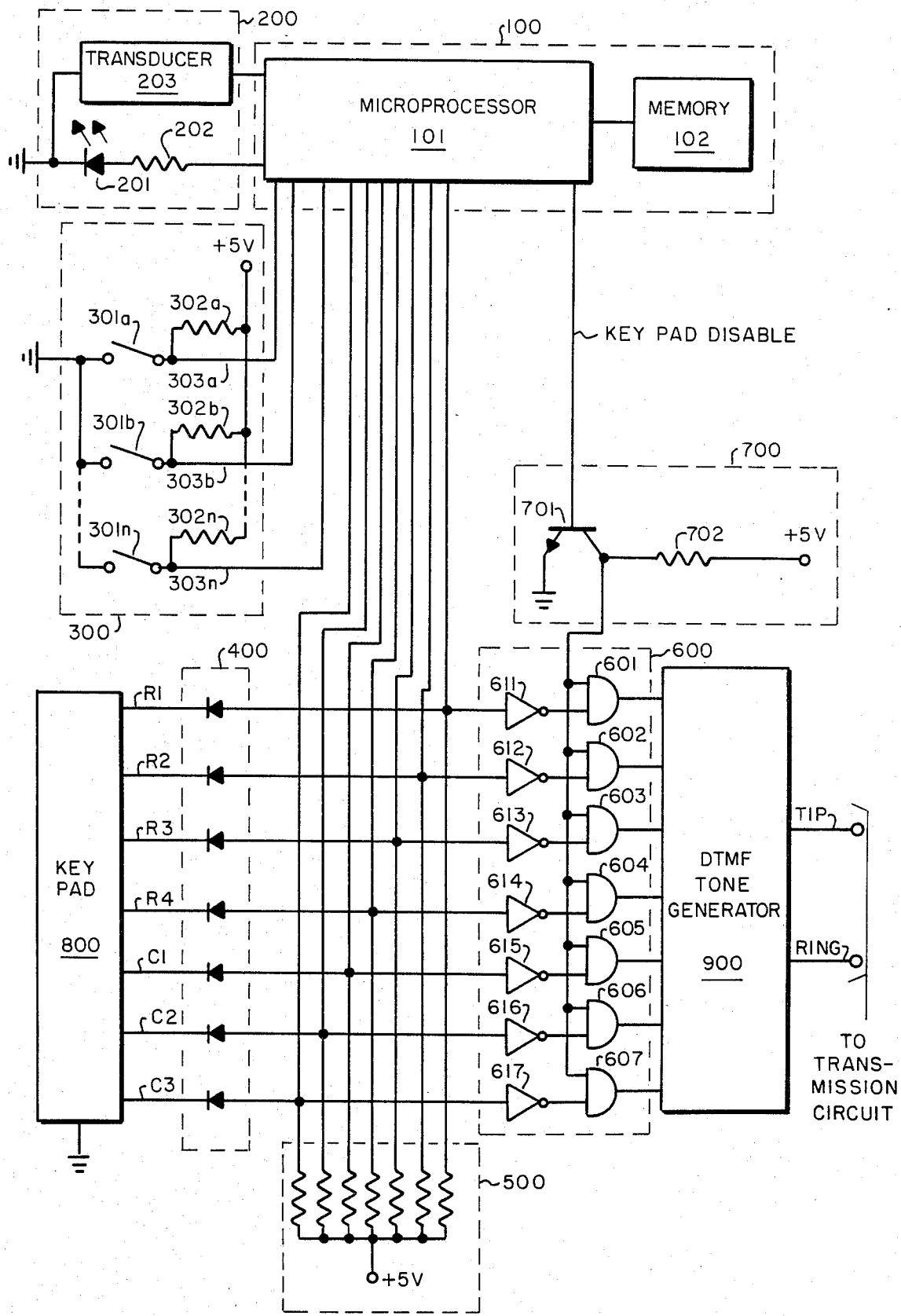

MASTER UNLOCK CIRCUIT FOR AN ELECTRONIC TELEPHONE

CROSS-REFERENCE TO RELATED APPLICATIONS

The following copending U.S. patent applications, are related to the present invention:

U.S. Pat. No. 4,453,040, entitled "Telephone Feature Assignment Circuit", issued on June 5, 1984 in the names of Louis W. Smith and Ann L. Wolf; and U.S. Pat. No. 4,453,042, entitled "Telephone Station Signaling Lock Circuit", issued on June 5, 1984 in the names of John G. Wagoner and Ann L. Wolf. The inventions claimed in the present application and both of these copending applications were assigned to the same assignee.

FIELD OF THE INVENTION

The present invention relates to telephone station lock circuits and more particularly to an arrangement for providing a master unlock feature for unlocking the signaling circuit of a feature telephone station.

BACKGROUND OF THE INVENTION

A novel telephone station signaling lock circuit was disclosed in the previously referenced U.S. patent entitled "Telephone Station Signaling Lock Circuit". As disclosed in that patent application the signaling circuit was locked or disabled by a microprocessor in response to operation of a station lock pushbutton. To unlock or enable the signaling circuit, the station lock pushbutton was again operated and selected keypad pushbuttons were subsequently operated. If the character signals provided by operation of these keypad pushbuttons are identical to a predetermined unlock code, the microprocessor then unlocks or enables the signaling circuit. However, if the unlock code is not known, the signaling circuit of a locked telephone station can not be unlocked, even in cases of emergency. The Master Unlock Circuit of the present invention overcomes this limitation.

SUMMARY OF THE INVENTION

In accordance with the present invention, a master unlock circuit is provided for use in a telephone station which includes a keypad operative to provide a plurality of pairs of row and column signals, a tone generator operative to provide a plurality of pairs of tones, a station lock switch operative to provide a station lock switch signal and a plurality of feature switches, each operative to provide a different feature switch signal.

The master unlock circuit includes storage means operative to provide a stored lock status signal, a stored unlock status signal and a stored master unlock code signal, each in response to a lock status signal, unlock status signal or master unlock code signal, respectively, being stored in said storage means.

The master unlock circuit also includes a microprocessor connected to the master unlock switch, the feature switches and the storage means and operative in response to the station lock switch signal and the stored unlock status signal to provide disable and first sensible control signals and to store a lock status signal in the storage means.

The microprocessor is further operative in response to the station lock switch signal, the stored lock status signal and signals representative of the stored master unlock code signal to provide enable and second sensible control signals and to store an unlock status signal in the storage means. The master unlock circuit further includes gating means coupled between the microprocessor and the tone generator and further coupled between the keypad and the tone generator. The gating means is operative in response to the enable signal and the pairs of row and column signals to provide gate signals representative of the pairs of row and column signals, and it is further operative in response to the disable signal to inhibit the gate signals. The tone generator is operative in response to the gate signals to provide an associated pair of tones.

The master unlock circuit further includes first sensible indication means connected to the microprocessor and operative in response to the first sensible control signal to provide a first sensible signal. It is operative in response to the second sensible control signal to provide a second sensible signal.

DESCRIPTION OF THE DRAWING

The single FIGURE of the accompanying drawing is a schematic diagram of a master unlock circuit in accordance with the present invention.

DESCRIPTION OF THE PREFERRED EMBODIMENT

Referring now to the accompanying drawing, the master unlock circuit of the present invention is shown. This circuit includes processing unit 100 connected to audible and visual display circuit 200, switch circuit 300, diode network 400, resistor network 500, gating circuit 600 and disable circuit 700. Diode network 400 is further connected to keypad 800, and gating circuit 600 is further connected to Dual Tone Multifrequency (DTMF) tone generator 900. Tone generator 900 is connectable to an associated transmission circuit via the TIP and RING leads.

Processing unit 100 includes microprocessor 101 connected to memory 102. Display circuit 200 includes transducer 203 and light emitting diode 201 which is connected to resistor 202.

Switch circuit 300 includes feature switches 301a–n, each of which is connected to ground when an associated pushbutton is depressed. Switches 301a–n are also connected to a +5 volt supply via resistors 302a–n. These switches are further connected to microprocessor 101 via leads 303a–n.

Diode network 400 includes seven protection diodes connected to keypad 800 via four row (R1–R4) and three column (C1–C3) leads. These diodes protect microprocessor 101 from extraneous high voltage signals applied to the row and column leads.

Keypad 800 is old and well known and includes four rows and three columns of pushbuttons. Each pushbutton causes its associated row and column leads to be connected to ground when it is operated.

DTMF tone generator 900 is also old and well known and is operative to provide a plurality of pairs of tones.

Resistor network 500 includes seven resistors connected to the +5 volt supply. Each resistor is further connected to an associated diode in diode network 400.

Gating circuit 600 includes seven AND gates, 601–607, connected to DTMF tone generator 900. The first input of each of these gates is connected to disable circuit 700. The second input of each of these gates is connected to an associated inverter in inverter group 611-617. Each inverter is further connected to the junction of an associated diode and resistor in diode and resistor networks 400 and 500, respectively.

Disable circuit 700 includes transistor 701 having its base connected to microprocessor 101, via the keypad disable lead, its emitter connected to ground, and its collector connected to the +5 volt supply via resistor 702.

Keypad 800, diode network 400, resistor network 500, gating circuit 600 and DTMF tone generator 900 operate, in combination, as a signaling circuit.

Under normal conditions, a logic level 0 signal is applied to the keypad disable lead so transistor 701 is turned off. Logic level 1 signals then appear at the first input of AND gates 601-607 via resistor 702 and the +5 volt supply. If none of the pushbuttons in keypad 800 is operated, a logic level 1 signal appears at the input of each inverter in inverter group 611-617 via resistor network 500 and the +5 volt supply. Inverters 611-617 then apply logic level 0 signals to the second input of each AND gate in gating circuit 601-607. Each AND gate then applies a logic level 0 signal to DTMF tone generator 900 causing it to prevent tones from being applied to the TIP and RING leads.

When a pushbutton is operated, ground is connected to an associated one of the row leads (R1-R4) and an associated one of the column leads (C1-C3). The resultant logic level 0 signals are inverted to logic level 1 signals by an associated pair of inverters in inverter group 611-617. A logic level 1 signal then appears at the second input of an associated pair of AND gates in gating circuit 600. Consequently, each of the associated pair of AND gates applies a logic level 1 signal to DTMF tone generator 900. This tone generator then applies a corresponding pair of tones to the TIP and RING leads.

In order to lock the signaling circuit, the station lock pushbutton is momentarily depressed causing switch 301a to close and connect lead 303a to ground. Microprocessor 101 detects the resultant logic level 0 switch signal on lead 303a and applies a logic level 1 (first sensible control) signal to light emitting diode (LED) 201 causing it to light (first sensible signal). Thus LED 201 provides a steady visual indication that the signaling circuit is locked.

Microprocessor 101 also writes a logic level 1 lock status signal into a station lock word in memory 102. The contents of this word then provide microprocessor 101 with an internal indication that the signaling circuit is locked. Microprocessor 101 then applies a logic level 1 disable signal to the keypad disable lead. This signal then appears at the base of transistor 701, causing it to turn on and apply a logic level 0 signal to the first input of each AND gate in gating circuit 600. Each of these AND gates then applies a logic level 0 signal to DTMF tone generator 900 causing it to prevent application of tones to the TIP and RING leads. Thus, keypad 800 is electrically disconnected from DTMF tone generator 900 and the signaling circuit is effectively locked.

In order to unlock the signaling circuit with a master unlock code, the station lock pushbutton is again momentarily depressed. Microprocessor 101 again detects the resultant logic level 0 switch signal and then reads the station lock word of memory 102. Since the signaling circuit is already locked, as indicated by a logic level 1 lock status signal stored in the station lock word, microprocessor 101 applies a pulsing or periodic logic level 1 (first sensible control) signal to LED 201 (first sensible indicator), causing it to flash at a rate of 120 interruptions per minute (first predetermined rate).

This flashing visual signal is used to prompt transmission of the master unlock code to microprocessor 101 via keypad 800. Selected keypad pushbuttons are then successively depressed, causing logic level 0 signals to appear on the associated row (R1-R4) and column (C1-C3) leads. Each pair of row and column signals represents a digit (0-9) or a character (# or *), and the associated pushbuttons are so identified. For example, the digit 2 is represented by logic level 0 signals appearing on the row 1 and column 2 leads. Microprocessor 101 detects the logic level 0 signals associated with each depressed pushbutton and determines the digit or character represented by each such pair of row and column signals. Microprocessor 101 accumulates these digit or character signals and compares the resultant keypad provided unlock code with the master unlock code previously stored in memory 102.

If the two codes compare, microprocessor 101 applies a logic level 0 enable signal to the keypad disable lead. This signal then appears at the base of transistor 701, causing it to turn off. A logic level 1 signal is then applied to the first input of each AND gate in gating circuit 600 via the +5 volt supply and resistor 702. This logic level 1 signal enables these AND gates and thereby allows them to apply subsequent row and column signals, as inverted by inverters 611-617, to DTMF tone generator 900. Thus the signals applied to DTMF tone generator 900 are representative of the row and column signals.

Microprocessor 101 also applies a logic level 0 (second sensible control) signal to LED 201, causing it to be extinguished (second sensible signal) and thereby provide an external indication that the signaling circuit is unlocked. Microprocessor 101 then writes a logic level 0 unlock status signal into the station lock word to provide an internal indication that the signaling circuit is unlocked. When unlocked by the master unlock code, microprocessor 101 also resets the memory data locations associated with the various features of a feature telephone, e.g., last number redial number, saved number redial number, repertory dial numbers, and station speed calling list.

If the keypad provided unlock code and the master unlock code stored in memory 102 do not match, microprocessor 101 compares the keypad provided unlock code with the stored station unlock code. If the keypad provided unlock code and the station unlock code compare, microprocessor 101 applies a logic level 0 enable signal to the keypad disable lead. This signal then appears at the base of transistor 701, causing it to turn off. A logic level 1 signal is then applied to the first input of each AND gate in gating circuit 600 via the +5 volt supply and resistor 702. This logic level 1 signal enables these AND gates and thereby allows them to apply subsequent row and column signals, as inverted by inverters 611-617, to DTMF tone generator 900. Thus the signals applied to DTMF tone generator 900 are representative of the row and column signals.

Microprocessor 101 also applies a logic level 0 (second sensible control) signal to LED 201, causing it to be extinguished (second sensible signal), and thereby provide an external indication that the signaling circuit is unlocked. Microprocessor 101 then writes a logic level 0 unlock status signal into the station lock word to provide an internal indication that the signaling circuit is unlocked.

If the keypad provided unlock code does not match the station unlock code or the master unlock code microprocessor 101 continues to apply the logic level 1 signal to the keypad disable lead, causing the signaling circuit to remain locked. Under these non-matching conditions, microprocessor 101 applies a pulsing or periodic logic level 1 (first sensible control) signal to LED 201 causing it to flutter at a rate of 480 interruptions per minute (second predetermined frequency). Microprocessor 101 also applies a logic level 1 (third sensible control) signal to transducer 203 (second sensible indicator) causing it to produce a continuous audible tone (second sensible signal). The fluttering LED and continuous audible tone provide visual and audible indications that an incorrect master unlock code was entered. The signals causing the audible tone and fluttering LED are removed after a predetermined time (e.g. five seconds). Microprocessor 101 then applies a steady logic level 1 signal to LED 201 causing it to provide a steady visual indication that the signaling circuit is still locked.

In another embodiment of the present invention, the master unlock code is defined to be simultaneous operation of a predetermined plurality of feature or keypad buttons. In order to unlock the signaling circuit under the feature button arrangement, the station lock pushbutton is again momentarily depressed. Microprocessor 101 again detects the logic level 0 switch signal and causes LED 201 to flash at the 120 interruptions per minute (ipm) rate.

A predetermined plurality a feature pushbuttons are then simultaneously operated, causing a corresponding plurality of logic level 0 signals to appear on associated leads 302b-n. Microprocessor 101 detects these logic level 0 feature button signals and retrieves the master unlock code from memory. This master unlock code is defined by a predetermined data pattern representing the corresponding predetermined plurality of feature buttons.

Microprocessor 101 then compares the master unlock code pattern to the pattern defined by the simultaneously operated feature buttons. If the two patterns compare, microprocessor 101 unlocks the signaling circuit and resets memory data locations, as previously described. If the two patterns do not compare the signaling circuit remains locked and visual and audible signals are provided to indicate detection of an invalid master unlock code. This response to detection of an invalid master unlock code was also previously described.

Thus the telephone station signaling lock circuit of the present invention allows the signaling circuit to be unlocked in response to operation of the station lock pushbutton and receipt of a predetermined master unlock code. This master unlock code can either be a code represented by a predetermined series of keypad pushbuttons or a code represented by simultaneous operation of a predetermined plurality of feature pushbuttons or keypad pushbuttons. If the code is defined to be a predetermined plurality of keypad pushbuttons microprocessor 101 operates in the same manner as was previously described for the code defined by a plurality of feature buttons. However, microprocessor 101 detects operation of the keypad pushbuttons on row and column leads R1–R4 and C1–C3, respectively.

It will be obvious to those skilled in the art that numerous modifications of the present invention can be made without departing from the spirit of the invention which shall be limited only by the scope of the claims appended hereto.

What is claimed is:

1. A master unlock circuit for use in a telephone station which includes a keypad operative to provide a plurality of pairs of row and column signals, a tone generator operative to provide a plurality of pairs of tones, and a station lock switch operative to provide a station lock switch signal, said master unlock circuit comprising:

storage means operative to provide a stored lock status signal, a stored unlock status signal and a stored master unlock code signal, each in response to a lock status signal, unlock status signal or master unlock code signal, respectively, being stored in said storage means;

a microprocessor connected to said station lock switch, said keypad and said storage means and operative in response to said station lock switch signal and said stored unlock status signal to provide disable and first sensible control signals and to store a lock status signal in said storage means;

said microprocessor being further operative in response to said station lock switch signal, said stored lock status signal and a plurality of pairs of row and column signals representative of said stored master unlock code signal to provide enable and second sensible control signals and to store an unlock status signal in said storage means;

gating means coupled between said microprocessor and said tone generator and further coupled between said keypad and said tone generator, said gating means being operative in response to said enable signal and said pairs of row and column signals to provide gate signals representative of said pairs of row and column signals, and further operative in response to said disable signal to inhibit said gate signals;

said tone generator being operative in response to said gate signals to provide an associated pair of tones; and first sensible indication means connected to said microprocessor and operative in response to said first sensible control signal to provide a first sensible signal, and further operative in response to said second sensible control signal to provide a second sensible signal.

2. A master unlock circuit as claimed in claim 1, wherein: said microprocessor is further operative in response to said station lock switch signal and said stored lock status signal to periodically provide said first sensible control signal at a first predetermined frequency, whereby said first sensible indicating means provides a corresponding periodic first sensible signal; said plurality of pairs of row and column signals being provided in response to said periodic first sensible signal.

3. A master unlock circuit as claimed in claim 1, wherein said storage means provides a plurality of telephone feature data locations, said microprocessor being further operative in response to said station lock switch signal, said stored lock status signal and said plurality of pairs of row and column signals representative of said stored master unlock code signal to clear said plurality of telephone feature data locations.

4. A master unlock circuit for use in a telephone station which includes a keypad operative to provide a plurality of pairs of row and column signals, a tone generator operative to provide a plurality of pairs of tones, a station lock switch operative to provide a station lock switch signal, and a plurality of feature switches, each operative to provide a different feature switch signal, said master unlock circuit comprising:

storage means operative to provide a stored lock status signal, a stored unlock status signal and a stored master unlock code signal, each in response to a lock status signal, unlock status signal or master unlock code signal, respectively, being stored in said storage means;

a microprocessor connected between said switches and said storage means and operative in response to said station lock switch signal and said stored unlock status signal to provide disable and first sensible control signals and to store a lock status signal in said storage means;

said microprocessor being further operative in response to said station lock switch signal, said stored lock status signal and a simultaneous plurality of feature switch signals representative of said stored master unlock code signal to provide enable and second sensible control signals and to store an unlock status signal in said storage means;

gating means coupled between said microprocessor and said tone generator and further coupled between said keypad and said tone generator, said gating means being operative in response to said enable signal and said pairs of row and column signals to provide gate signals representative of said pairs of row and column signals, and further operative in response to said disable signal to inhibit said gate signals;

said tone generator being operative in response to said gate signals to provide an associated pair of tones; and first sensible indication means connected to said microprocessor and operative in response to said first sensible control signal to provide a first sensible signal, and further operative in response to said second sensible control signal to provide a second sensible signal.

5. A master unlock circuit as claimed in claim 4, wherein: said microprocessor is further operative in response to said station lock switch signal and said stored lock status signal to periodically provide said first sensible control signal at a first predetermined frequency, whereby said first sensible indicating means provides a corresponding periodic first sensible signal; said plurality of feature switch signals being provided in response to said periodic first sensible signal.

6. A master unlock circuit as claimed in claim 4, wherein said storage means provides a plurality of telephone feature data locations, said microprocessor being further operative in response to said station lock switch signal, said stored lock status signal and said plurality of feature switch signals representative of said stored master unlock code signal to clear said plurality of telephone feature data locations.

7. A master unlock circuit for use in a telephone station which includes a keypad operative to provide a plurality of pairs of row and column signals, a tone generator operative to provide a plurality of pairs of tones, a station lock switch operative to provide a station lock switch signal, and a plurality of feature switches, each operative to provide a different feature switch signal, said master unlock circuit comprising:

storage means operative to provide a stored lock status signal, a stored unlock status signal and a stored master unlock code signal, each in response to a lock status signal, unlock status signal or master unlock code signal, respectively, being stored in said storage means;

a microprocessor connected between said switches and said storage means and operative in response to said station lock switch signal and said stored unlock status signal to provide disable and first sensible control signals and to store a lock status signal in said storage means;

said microprocessor being further operative in response to said station lock switch signal, said stored lock status signal and a simultaneous plurality of pairs of row and column signals representative of said stored master unlock code signal to provide enable and second sensible control signals and to store an unlock status signal in said storage means;

gating means coupled between said microprocessor and said tone generator and further coupled between said keypad and said tone generator, said gating means being operative in response to said enable signal and said pairs of row and column signals to provide gate signals representative of said pairs of row and column signals, and further operative in response to said disable signal to inhibit said gate signals;

said tone generator being operative in response to said gate signals to provide an associated pair of tones; and first sensible indication means connected to said microprocessor and operative in response to said first sensible control signal to provide a first sensible signal, and further operative in response to said second sensible control signal to provide a second sensible signal.

8. A master unlock circuit as claimed in claim 7, wherein: said microprocessor is further operative in response to said station lock switch signal and said stored lock status signal to periodically provide said first sensible control signal at a first predetermined frequency, whereby said first sensible indicating means provides a corresponding periodic first sensible signal; said plurality of pairs of row and column signals being provided in response to said peiodic first sensible signal.

9. A master unlock circuit as claimed in claim 7, wherein said storage means provides a plurality of telephone feature data locations, said microprocessor being further operative in response to said station lock signal, said stored lock status signal and said plurality of pairs of row and column signals representative of said stored master unlock code signal to clear said plurality of telephone feature data locations.

* * * * *